United States Patent
Gupta (10) Patent No.: US 11,864,565 B2
(45) Date of Patent: Jan. 9, 2024

(54) METHOD FOR MAKING A LAYERED FROZEN CONFECTIONARY PRODUCT

(71) Applicant: SOCIETE DES PRODUITS NESTLE S.A., Vevey (CH)

(72) Inventor: Sanjay Gupta, Bakersfield, CA (US)

(73) Assignee: Societe des Produits Nestle S.A., Vevey (CH)

( * ) Notice: Subject to any disclaimer, the term of this patent is extended or adjusted under 35 U.S.C. 154(b) by 631 days.

(21) Appl. No.: 16/771,443

(22) PCT Filed: Dec. 7, 2018

(86) PCT No.: PCT/EP2018/083954
§ 371 (c)(1),
(2) Date: Jun. 10, 2020

(87) PCT Pub. No.: WO2019/115384
PCT Pub. Date: Jun. 20, 2019

(65) Prior Publication Data
US 2021/0068418 A1  Mar. 11, 2021

Related U.S. Application Data

(60) Provisional application No. 62/599,353, filed on Dec. 15, 2017.

(51) Int. Cl.
*A23G 9/28* (2006.01)
*A23G 9/48* (2006.01)

(52) U.S. Cl.
CPC ............ *A23G 9/282* (2013.01); *A23G 9/283* (2013.01); *A23G 9/288* (2013.01); *A23G 9/485* (2013.01)

(58) Field of Classification Search
None
See application file for complete search history.

(56) References Cited

U.S. PATENT DOCUMENTS

| 3,347,287 A | 10/1967 | Geber | |
|---|---|---|---|
| 6,223,949 B1 * | 5/2001 | Spencer | A23G 3/2015 137/637.4 |
| 2013/0045310 A1 * | 2/2013 | Ricco | A23G 9/28 99/452 |

FOREIGN PATENT DOCUMENTS

| CN | 104349681 A | 2/2015 |
|---|---|---|
| CN | 104411179 A | 3/2015 |

(Continued)

OTHER PUBLICATIONS

Chinese Office Action for Chinese Appl No. 201880073787.0 dated Dec. 1, 2022.

*Primary Examiner* — Jenna A Watts
(74) *Attorney, Agent, or Firm* — K&L Gates LLP (57) ABSTRACT

The invention relates to an apparatus (1) for making a frozen confectionery product (3) by rotary vertical extrusion into a container (2), said apparatus comprising a nozzle (3) comprising a frozen confectionery passage (4) with one inlet port (5) and a single outlet port (6) having an elongated cross-section, two coating passages (7) with two coating inlet ports (8) and two corresponding coating outlet ports (9) having elongated cross-sections, wherein the frozen confectionery passage inlet port (5) and the single elongated outlet port (6) are joined by a funnel passage (10) expanding at an angle of at least 35-25°, preferably 32-27°, relative to the flow direction in the nozzle (3) and a land length passage (11) having walls parallel to the flow direction of the nozzle, and wherein the coating outlet ports (9) are positioned on the inside walls of the land length passage (11) upstream of the frozen confectionery outlet port (6) and extends in parallel to the frozen confectionery outlet port (6), so as to form an annular or helical coating layer (12) in or on the frozen confectionery (13) upon rotation of the nozzle (3) and the container (2) with respect to one another. The invention also (Continued)

relates to a method of making frozen confectionery product with large inclusions and to the product as such.

12 Claims, 6 Drawing Sheets

(56) References Cited

FOREIGN PATENT DOCUMENTS

| | | | |
|---|---|---|---|
| CN | 106998739 A | 8/2017 | |
| EP | 1277411 A2 * | 1/2003 | ............. A23G 9/285 |
| EP | 2345332 | 7/2011 | |
| WO | WO-2004067386 A2 * | 8/2004 | ............. A23G 9/045 |
| WO | 2011086058 | 7/2011 | |
| WO | 2013149889 | 10/2013 | |
| WO | WO-2016096727 A1 * | 6/2016 | ............... A23G 1/54 |
| WO | 2016207102 | 12/2016 | |

* cited by examiner

METHOD FOR MAKING A LAYERED FROZEN CONFECTIONARY PRODUCT

CROSS REFERENCE TO RELATED APPLICATIONS

The present application is a National Stage of International Application No. PCT/EP2018/083954, filed on Dec. 7, 2018, which claims priority to U.S. Provisional Patent Application No. 62/599,353, filed on Dec. 15, 2017, the entire contents of which are being incorporated herein by reference

FIELD OF THE INVENTION

This invention relates to a frozen confectionery product with a layered structure and to a method and an apparatus for manufacturing the same.

BACKGROUND

Different frozen confectionery products exist containing crispy layers of a fat-based coating.

U.S. Pat. No. 5,283,070 discloses a layered food product made by extruding an aerated ice composition into a vertically descending helix rotating about a vertical axis and having spaced flights which define passages there between in the helix. A second fat-based or water-based or sugar-containing composition is sprayed into passages of the extruded helix. The sprayed helix is deposited into a cone. The food product is a layered food product having alternating layers of aerated ice composition and sprayed composition. This way of making a layered product makes it difficult to control the thickness of the fat-based layers.

U.S. Pat. No. 5,603,965 relates to the production of cakes of ice confectionery containing integrated decorative layers of crisp material such as chocolate. The ice cream is horizontally extruded, and chocolate is sprayed on an ice cream layer. Here also it is difficult to control the thickness of the chocolate layers and the chocolate is added onto the products as flakes.

EP2523565 discloses a frozen confectionery product and an apparatus for manufacturing a frozen confectionery product by rotary vertical extrusion. The apparatus comprises a nozzle and at least one ice-cream passage with at least one inlet port and an outlet port, and at least one chocolate passage with respectively an inlet port and an outlet port. The outlet ports are provided in the nozzle and have elongated cross-sections, and each chocolate outlet port extends in parallel to an ice cream outlet port, so as to form annular or helical chocolate layers upon rotation of the nozzle and the container with respect to each other. Although this way of manufacturing of frozen confectionery allows the making of thin layers of chocolate it is not suitable for product with inclusions. Running the nozzle with inclusions creates the risk of the nozzle being blocked with particles and the production line stopped.

Desired inclusions in the layered frozen confectionery product are typically larger than 6 mm, preferably from 10 to 12 mm. Inclusions may e.g. be chocolate chips, cookie dough, fruit pieces, nuts etc. However, the nozzles of the prior art does not provide the possibility of making layered products with larger inclusion in the aerated ice composition.

There is a need for an apparatus which can make confectionery product, comprising very thin layers of chocolate or sauce while at the same time providing frozen confectionery layers comprising inclusions of 10-12 mm.

OBJECT OF THE INVENTION

It is the object of present invention to provide an apparatus and a method for making frozen confectionery products which overcomes the drawbacks mentioned above. It is furthermore the object of the present invention to provide a novel frozen confectionery product, comprising very thin and crispy chocolate layers which are regularly distributed in the product and at the same time provide frozen confectionery layers comprising inclusions of 10-12 mm.

SUMMARY OF THE INVENTION

In a first aspect the invention relates to an apparatus for making a frozen confectionery product by rotary vertical extrusion into a container, said apparatus comprising a nozzle comprising
- a frozen confectionery passage with one inlet port and a single outlet port having an elongated cross-section,
- two coating passages with two coating inlet ports and two corresponding coating outlet ports having elongated cross-sections,
  - wherein the frozen confectionery passage inlet port and the single elongated outlet port are joined by a funnel passage expanding at an angle of at least 35-25°, preferably 32-27°, relative to the flow direction in the nozzle and a land length passage having walls parallel to the flow direction of the nozzle, and
  - wherein the coating outlet ports are positioned on the inside walls of the land length passage upstream of the frozen confectionery outlet port and extends in parallel to the frozen confectionery outlet port, so as to form an annular or helical coating layer in or on the frozen confectionery upon rotation of the nozzle and the container with respect to one another.

It has been found that the prior art nozzles would not handle any inclusions larger than 4 mm beyond which nozzle would get blocked with particles. Simply widening of channels in prior art nozzles would require a nozzle head to be much bigger and thus it may not fit in into standard cones, cups and packaging. It has also been found that when keeping the same nozzle diameter, the expanded channels will cause mixing of streams and thus not allow distinct layers. Furthermore, simply widening the channels in prior art nozzles would create bigger opening in the center for frozen confectionery and will not allow formation of clearly separated layers with sauce.

The present invention solves these problems by means of the above described nozzle. The present invention also makes it possible to obtain two coating helixes in one step while laying the coatings such as chocolate and/or sauce with frozen confectionery product comprising inclusions of 10-12 mm. In addition it has been found that it is possible to include a coating with inclusions up to the size of 4-6 mm.

The apparatus according to the invention further has the advantage that the profile of the nozzle minimizes plugging of the nozzle.

A further advantage of the invention is that product which has a better and uniform distribution of inclusions across the height of product may be obtained.

According to a preferred embodiment of the invention, at least two coating passages with respective inlet port and outlet port are provided, i.e. each outlet port is connected to its own coating passage with its own inlet port, and the coating flow is thus metered separately for each outlet port. This avoids clumping of chocolate in one of the circuits. Furthermore this gives the possibility of making a product having different crunchy layers, for example different types of chocolate or other layers.

The nozzle in the apparatus according to the invention has a smooth frozen confectionery passage. The design of the funnel passage result in an even spreading out of the frozen confectionery into an even band of frozen confectionery extending the full width of the funnel passage from which it continues in a band throughout the land length part of the frozen confectionery passage and into a single outlet port of the frozen confectionery.

In addition the nozzle in the apparatus according to the invention has the advantage that the position of the coating outlet ports inside the frozen confectionery passage applies the coating as an integrated part of the frozen confectionery product. This provides well defined helical coating layers at the surface of the frozen confectionery but still as an integrated part of the product. Prior art nozzles add the coating material onto the extruded frozen confection outside the outlet ports of the nozzles which increases the risk that helix coating layers are broken into flakes and that the helix coating layers not in one piece.

In a second aspect the invention relates to a method for manufacturing a frozen confectionery product using an apparatus according to any of the preceding claims, wherein frozen confectionery with inclusions having a size of 6-12 mm, preferably 10-12 mm, and coating material with and without inclusions are simultaneously extruded through the respective outlets of the apparatus into a container, while the nozzle and the container are rotated with respect to one other at a speed to make at least 3 layers, preferably create 3 to 8 layers, and the distance between the nozzle and the container is increased by a vertical movement of either the container or the nozzle.

In a further aspect the invention relates to the nozzle as such.

In a final aspect, the invention relates to a frozen confectionery product comprising a container and an frozen confectionery extruded into the container, wherein a plurality of sauce and/or chocolate patterns are provided in the frozen confectionery, said sauce and/or chocolate patterns having the form of a substantially helical chocolate and/or sauce layers forming substantially annular parallel chocolate and/or sauce layers having a thickness of 0.5 to 1.0 mm, spaced by frozen confectionery layers of 10-12 mm, said frozen confectionery comprising inclusions having a size of 10 to 12 mm. The container is preferably a tub or a cone. In a particular preferred embodiment of the invention the cone is a wafer cone.

BRIEF DESCRIPTION OF THE DRAWINGS

In the drawings which illustrate example embodiments of this invention.

DETAILED DESCRIPTION OF THE INVENTION

In the present context coating refers to coating material such as chocolate, sauce or a combination thereof.

It should be noted that, where nothing else is specified, the term "chocolate" used in the present application should comprise any composition similar to a recipe containing cocoa or chocolate which can form crunchy layers in an ice cream product. In a particular embodiment of the invention by chocolate is meant an edible food confection made of a mixture of cacao powder, cocoa butter and sugar. It can contain a certain amount of spices as vanilla or other vegetable fats according to local legislation. It may also be compound coating or other fat based confectionery mass coating.

By a sauce is meant edible liquid or semi-liquid mix. Examples of sauces are: fruit sauce, soft gel, nut preparation, caramel etc. The sauce can include particles or pieces. A fruit sauce may e.g. be an aqueous fruit composition containing pieces of fruit in water. The sauce formulation may contain fat.

The sauce layer preferably has a viscosity of between 1.2 and 1.7 Pa·s at a temperature below +47° C. Preferably the sauce layer has a viscosity of between 1.5 and 1.7 Pa·s, more preferably of 1.58 Pa·s at a temperature below +47° C. Is has been found that at viscosities above this values the sauce will need to be heated too much to reduce the viscosity which may destroy the quality of the sauce and soften the ice cream with the effects as discussed above. Below these values the sauce becomes too runny and is difficult to handle because the sauce drops in an irregular manner and the desired design of the sauce layer is not achieved.

By frozen confectionery is meant in the context of the invention include both aerated confections and non-aerated confections to be consumed in a frozen state or semi frozen state. Non limiting examples of frozen confections considered in the context of the invention include ice cream, sorbet, sherbet, frozen yogurt, gelato and mellorine.

The frozen confectionery preferably has a viscosity of at least 10 Pa·s. at a temperature of −6 C, more preferably 15 to 20 Pa·s. It has been found that at this viscosity it is possible to feed two or more types or flavours of frozen confectionery at the same time through the frozen confectionery passage and out of the outlet port without the different frozen confectionery mixing together.

The viscosities of the sauces according to the invention is measure as follows: The method for determining the viscosity of the sauce consists done by means of a rotational Rheometer (Anto Paar physica MCR 300) and a Pelletier oven. In the method a shear rate of 100s−1 is applied upon a rage of temperature from 10 to 45° C. in the Rheometer (Anto Paar physica MCR 300) equipped with a plan measuring system and Pelletier oven, connected to a water bath with temperature control system. A volume of 0.8 ml of the sauce, without any pretreatment, is placed on the plate and the geometry CP.50 is installed. Then, the Pelletier oven is closed and the software is initiated to start the measurements as specified below.

Furthermore, in the present context "the elongated cross section" of the outlet ports can have any shape, in particular it can be rectangular, but also curved.

According to a preferred embodiment of the invention, the apparatus comprises a fixed body, and the nozzle can be rotated with respect to said fixed body. The inlet ports are then provided in the fixed body and the outlet ports in the rotatable nozzle. Preferably the rotatable nozzle and the fixed body are coaxial to each other. The inlet ports can thus be distributed around the apparatus and be connected to the outlet ports through annular passages.

Alternatively, the apparatus and the nozzle can remain static, and the container is rotated during extrusion.

In the same way, the apparatus may comprise a motor for a vertical movement so that it can be moved away from the container while filling it. Alternatively, the container can be moved away from the apparatus and the apparatus remains static.

In a preferred embodiment of the invention, the nozzle comprises frozen confectionery outlet port which is 10-17, preferably 15-17 mm wide and/or the coating outlet ports which are 3-12 mm, preferably 6-8 mm. With this width of the outlet port(s) inclusions of 10-12 mm may be included in the frozen confectionery. In addition it has been found that it is possible to have coating with inclusions up to the size of 4-6 mm.

Furthermore, in a preferred embodiment of the apparatus the frozen confectionery outlet port in the nozzle is 60-100 mm, preferably 65-80 mm, more preferably 68-75 mm long. It is also preferred that the coating outlet ports in the nozzle are 6-20 mm, preferably 8-15 mm long. The appropriate size of the outlet ports depend on the size of packaging. The apparatus may thus be used for cones, cups, tubs, bulk containers, sandwiches etc.

It is preferred that the cross section of the coating passages corresponds substantially to cross section of the coating outlet ports. For the frozen confectionery passage, there is the variation which results from increase due to the funnel passage part of the frozen confectionery passage.

To form parallel helical coating layers in the frozen confectionery it is preferred that the two coating outlet ports are arranged symmetrically with respect to a central frozen confectionery outlet port. For an effect of a visible coating layer the coating outlet ports are preferably arranged at the ends or edges of the elongated outlet port for the frozen confectionery. Thus, in a preferred embodiment of the invention the nozzle has the coating outlet ports positioned at an edge of the frozen confectionery outlet port, to allow the coating to be visible on the outside of the product.

In an alternative embodiment of the invention the nozzle has the coating outlet ports are positioned between an edge of the frozen confectionery outlet port and the axis of rotation of the apparatus to create a coating layer internally in the product.

The apparatus according to the invention may have a single frozen confectionery inlet port to the frozen confectionery passage for receiving one type of frozen confectionery product with inclusions. However, the frozen confectionery passage may also have two or more ice-cream inlet ports leading into the passage before the funnel passage of the confectionery passage). This allows two or more flavours or types of frozen confection with inclusions to be dosed with the apparatus.

It is preferred that the nozzle is rotatable and rotates with respect to a fixed body during extrusion, and that the inlet ports are provided in the fixed body and the outlet ports in the rotatable nozzle.

In a referred embodiment of the invention the nozzle is rotating about a vertical axis going through the centre of the single outlet port of the frozen confectionery passage.

Advantageously, the coating passage according to the invention is insulated from the frozen confectionery passage until it joins the frozen confectionery passage ice-cream passage. This prevents the coating from solidifying and freezing, resulting in a blockage of the coating passage. The insulation of the coating passage from the frozen confectionery passage may be particular important if real chocolate is used as the coating material due to the temperature at which the chocolate solidifies.

In the nozzle according to the invention it is not necessary to divide the outlet or outlet port of the frozen confectionery passage. The rotation of the nozzle generates the helix layers of frozen confection and coating material around on both sides of the rotation axis of the nozzle. In a preferred embodiment the frozen confectionery passage's single outlet port does not include any inserted member(s) separating the frozen confectionery in one or more streams.

According to a preferred embodiment of the invention, two outlet ports of the coating passages are arranged symmetrically with respect to the frozen confection outlet port. This makes it possible to extrude a frozen confectionery together with coating material being added to the surface of the frozen confectionery's surface on two sides of the frozen confectionery is two chocolate helixes which will start and end on different sides of the container.

According to a preferred embodiment of the invention, the coating passages are separated and insulated from the frozen confectionery passage until it joins the frozen confectionery passage ice-cream passage. This avoids that the liquid coating e.g. chocolate is chilled by the frozen confectionery which could lead to undesired clumping of the chocolate. If chocolate is used for the coating, the chocolate can be maintained at a temperature above its melting point and solidifies only when extruded and it is in direct contact with the frozen confectionery and forms the desired layer. It is thus possible to obtain very thin and regular chocolate layers.

The coating passages are preferably formed by a metal tubes. The frozen confectionery passage is preferably formed in a moulded or machined plastic.

The frozen confectionery product according to the invention comprises a container such as a tub or a cup, preferably in an individual portion size. The container can also be an edible container such as a wafer cup or cone. The product furthermore comprises an aerated frozen confection extruded into the container, wherein a plurality of thin chocolate patterns are provided in the aerated frozen confection. The frozen confection can be any extrudable, i.e. relatively soft, frozen confection such as ice cream, sherbet, sorbet, or frozen yoghurt. The chocolate patterns have the form of at least one, preferably two or more, substantially helical chocolate layers which may extend across the complete height of the container and forming substantially annular parallel chocolate layers. "Extending across the complete height of the container" means that the lower end of the helical chocolate layer is situated close to the bottom of the container, although it does not necessarily have to touch the bottom. In the same way the upper end of the chocolate layer lies close to the top of the frozen confection, although it might not be visible at the surface. When the frozen confection is cut vertically, the helical chocolate structure appears as a plurality of annular layers which are substantially parallel to each other and to the bottom of the container.

The top of the frozen confection may not be flat but rather conical, i.e. the cross section of the frozen confection when cut vertically may be tapered towards the top of the product.

It is particularly attractive to have a spiral-like top with the helical chocolate structure being visible from the top. It is rather difficult to finish a traditional ice cream cone with a spiral-like top being extruded, as the shape retention of the extrudable frozen confection is in general not sufficient to achieve a form-stable shape. The chocolate layers provide additional shape retention to the ice confection in such a way that is now easier to obtain a stable, i.e. free-standing conical or spiral structure protruding from the container. The invention therefore opens up new possibilities of obtaining shaped tops for cones with frozen confectionery including inclusions, in particular for wafer cones, but also for transparent cups or any other type of container, the product thus being visually more attractive for the consumer.

It should be noted that the shaping effect can also be advantageously used when combining a frozen confection having relatively high shape retention on the outside of the product with a softer frozen confection, having a lower shape retention, e.g. a sorbet, on the inside.

In an embodiment of the invention the coating layer is preferably real chocolate in the sense of the Directive 2000/36/EC of the European Parliament and of the Council of 23 June 2000 relating to cocoa and chocolate products intended for human consumption, i.e. it contains little or no vegetable fat except for the cocoa butter which is naturally present in chocolate. Compared to the frequently used and cheaper fat-based materials, real chocolate has a better taste and a higher quality. As cocoa butter has a melting point of 34°-38° C., the melting point of the chocolate forming the layers is lying above 34° C.

This is relatively high compared to fat-based materials which are frequently used for forming inclusions or crunchy layers in ice confections, and which have a melting point of around 24° C. (corresponding to the melting point of coconut oil which is often added in fat-based chocolate compositions used in ice confectionery products). A layer of real chocolate having the same thickness will be perceived as more crunchy and crispy than a similar layer of fat-based material. However, due the high melting point, it is more difficult to work with real chocolate when making ice confectionery products, as clumping and forming of excessively thick layers is frequent.

The method and apparatus of the present invention make it possible to produce very thin, regular and crunchy layers of real chocolate or sauce even including inclusions.

Preferably the chocolate layers have a thickness of 0.5-3.5 mm, more preferably 0.8-3.5 mm, even more preferably between 9.0 mm and 2.5 mm. Below a thickness of 0.5 mm the layers are not perceived as crunchy anymore. Below a thickness of 0.9 mm the crunchiness is getting less perceivable but may still be acceptable. Preferably, for at least 80%, preferably 90% of the surface of the layers, the layers have a thickness of 0.4-0.8 mm. When using real chocolate as explained above, consumers perceive the layers as crunchy, but not too hard to be spooned for a layer thickness in this range. The same perception may be achieved with a different layer thickness for different chocolate recipes.

Preferably the distance between two parallel chocolate or sauce layers is 10-18 mm, ideally 10-12 mm for a cup or tub. This means that for example for an ice cream with inclusions in a cup having a height of 50 mm, 4 to 5 layers of chocolate will be present, while 8 to 9 layers will be present in a cup having a height of 90-100 mm. This distance leads to a well-balanced product. In a cone the ice cream layers may be thinner, for about 10 mm.

In a preferred embodiment of the method of the invention simultaneously frozen confectionery and coatings are extruded through the respective outlets (6,9) of the apparatus into a container (2), while the nozzle (3) and the container (2) are rotated at a speed with respect to one another of 200-650 rpm, preferably 200-400 rpm when the container is a tub and 550-650 rpm when the container is a cone.

According to a preferred embodiment of the invention, the aerated frozen confectionery has itself a helically layered structure formed by at least two visually different types of aerated frozen confection alternating with the chocolate layers. Such a product is not only visually more appealing, but the use of two different types of aerated frozen confection, e.g. two different ice cream flavours, gives a lot of possibilities to create interesting dessert compositions.

EXAMPLES

By way of example and not limitation, the following examples are illustrative of various embodiments of the present disclosure.

Figure 1A:
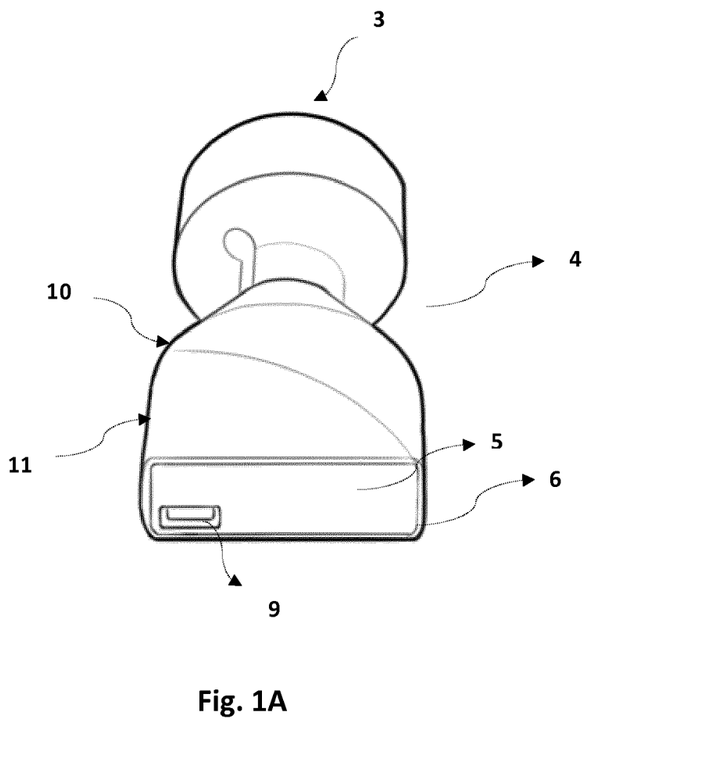
FIG. 1A is a perspective principle drawing of a nozzle according to the invention.
Figure 1B:
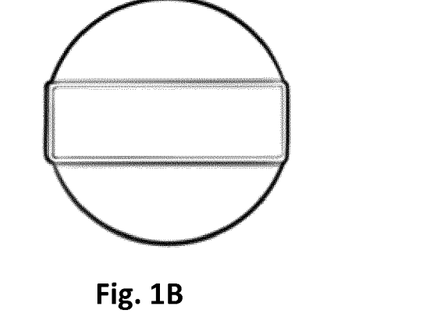
FIG. 1B is an end view of the nozzle in FIG. 1A.

FIG. 1A shows a nozzle according to the invention in perspective view while FIG. 1B is the end view of the same nozzle. The figures show a frozen confectionery passage (4) with one inlet port (5) and a single outlet port (6) having an elongated cross-section. The nozzle has two coating passages with two coating inlet ports (not shown) and two corresponding coating outlet ports (9) of having elongated cross-sections. The coating outlet ports (9) are position at the edge of the elongated cross-section outlet port (6).

The frozen confectionery passage inlet port (5) and the single elongated outlet port (6) are joined by a funnel passage (10) expanding at an angle of at least 35-25°, relative to the flow direction in the nozzle (3). The frozen confectionery passage (4) also has a land length passage (11) having walls parallel to the flow direction of the nozzle. Two coating outlet ports (9) are positioned on an inside wall of the land length passage (11) upstream of the frozen confectionery outlet port (6). Only one coating outlet port (9) is shown. The other one is place on the upper wall of the land length passage (11) and cannot be seen in the drawning. The coating outlet ports (9) extend in parallel to the frozen confectionery outlet port (6). When frozen confectionery product and coating material is extruded through the nozzle an annular or helical coating layer is formed in or on the frozen confectionery upon rotation of the nozzle (3) and the container (2) with respect to one another.

FIG. 1B shows the end view of the nozzle in FIG. 1A. The width of the frozen confectionery outlet port (6) is 15-17 mm and the coating outlet port (9) shown in FIG. 1A is 9-12 mm wide.

Figure 2:
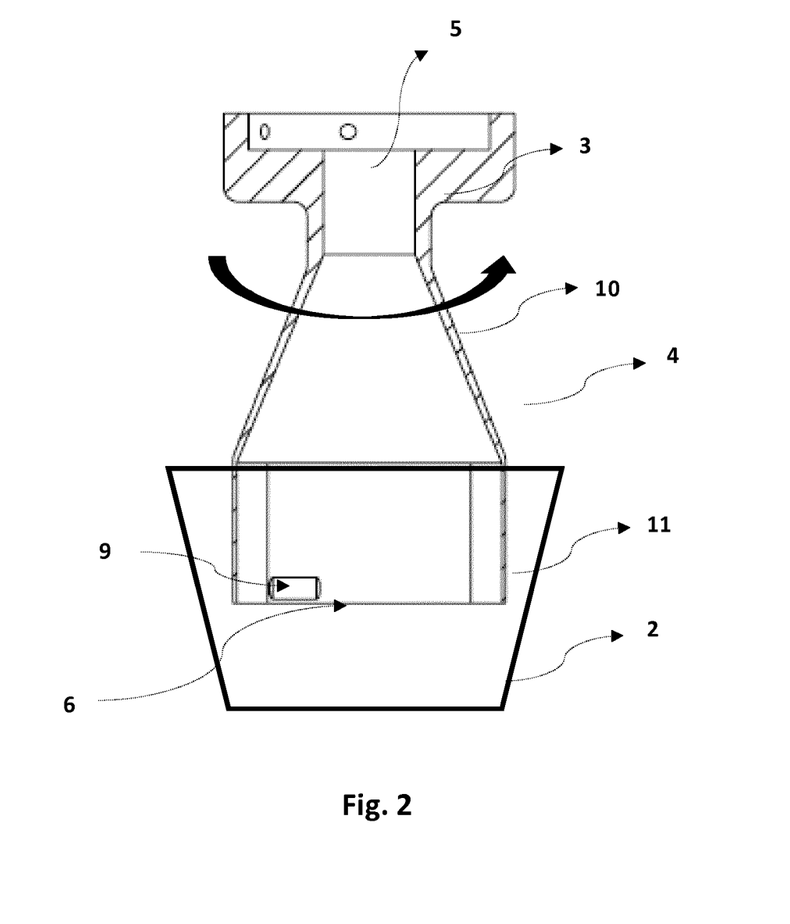
FIG. 2 is a cross-sectional view of the nozzle in FIG. 1A.

FIG. 2 shows a cross-sectional view of the nozzle in FIG. 1A. The nozzle (3) has a frozen confectionery passage (4), a frozen confectionery passage inlet port (5) and a frozen confection outlet ports (6). The coating passage is not show. The coating outlet ports (9) is positioned upstream of the frozen confectionery outlet (6). The frozen confectionery passage (4) has a part which is a passage which has a funnel shape (funnel passage (10)). In this part of the passage the frozen confection is spread from the inlet port (5) to ensure a full filling of the nozzle. The frozen confectionery passage (4) further has a part which is land length shaped (land length passage (11)). In this part of the passage the frozen confection has a linear flow which result in an evenly sized band of frozen confection exiting the outlet port (5) with evenly distributed inclusions.

Figure 3:
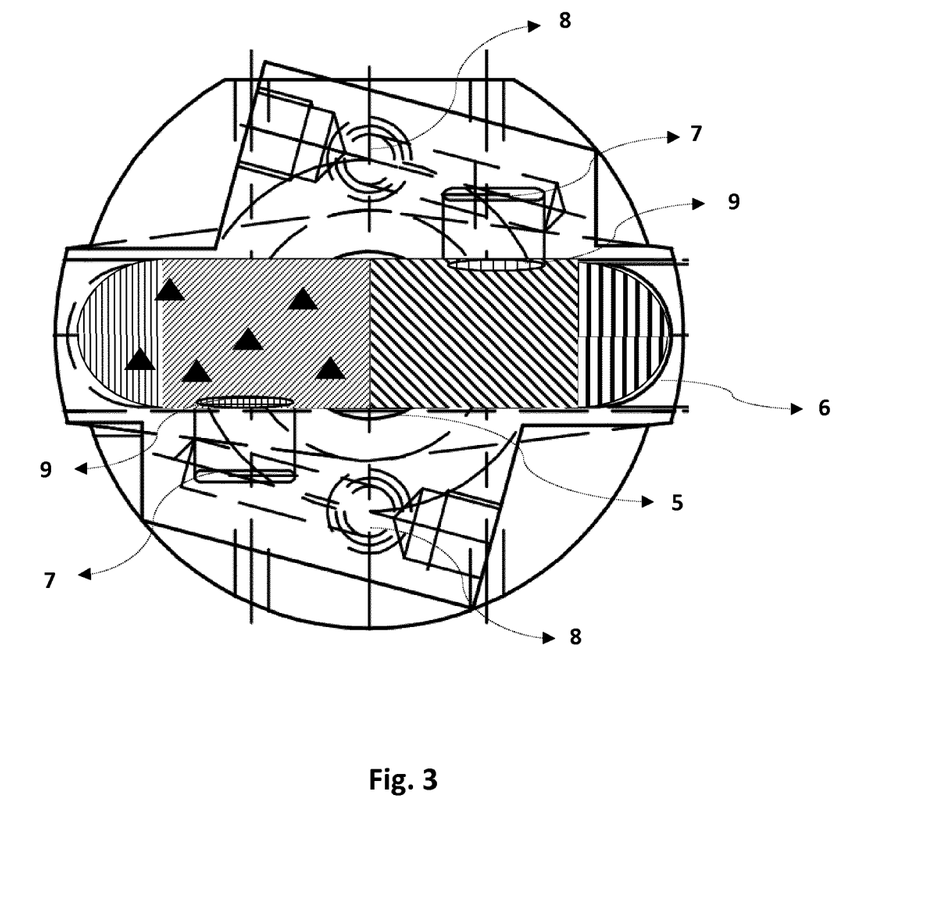
FIG. 3 is end view of the nozzle according to the invention showing the frozen confectionery outlet port and indication of the coating passages.

FIG. 3 is an end view of a nozzle (3) according to the invention. It shows an indication of the coating passages (7) and the frozen confectionery outlet port (6). FIG. 3 furthermore shows the frozen confectionery passage inlet port (5) in the centre and two coating inlet ports (8) placed on opposite sides. The coating outlet ports (9) are where the coating passage (7) meets the frozen confectionery passage. The frozen confection frozen confectionery (13) exits the outlet port (6). The frozen confection outlet port shows different frozen confectioneries with and without inclusions exiting the outlet port (6).

Figure 4:
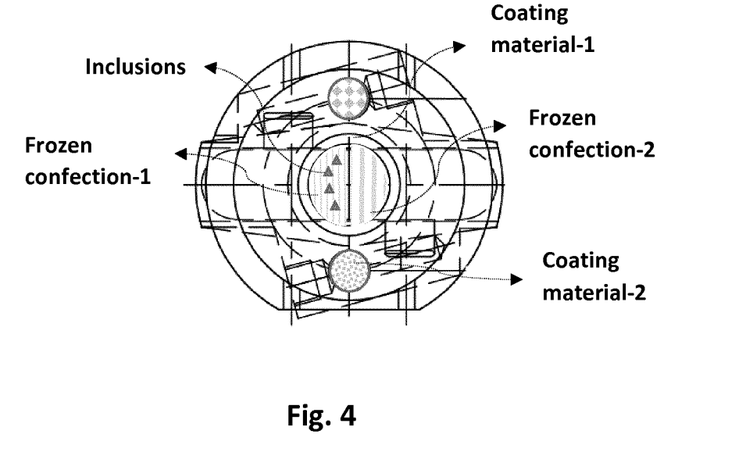
FIG. 4 is a top view of the nozzle according to the invention showing frozen confectionery and coating inlets and indication of the coating passages and the frozen confectionery outlet port.

FIG. 4 is a top view of the nozzle according to the invention showing frozen confectionery and coating inlets and indication of the coating passages and the frozen confectionery outlet port. The frozen confection inlet ports are fed with two different frozen confectioneries (confectionery 1 and 2), one with inclusions. Furthermore, two different types of coating material (material 1 and 2) are fed into the coating inlets.

Figure 5:
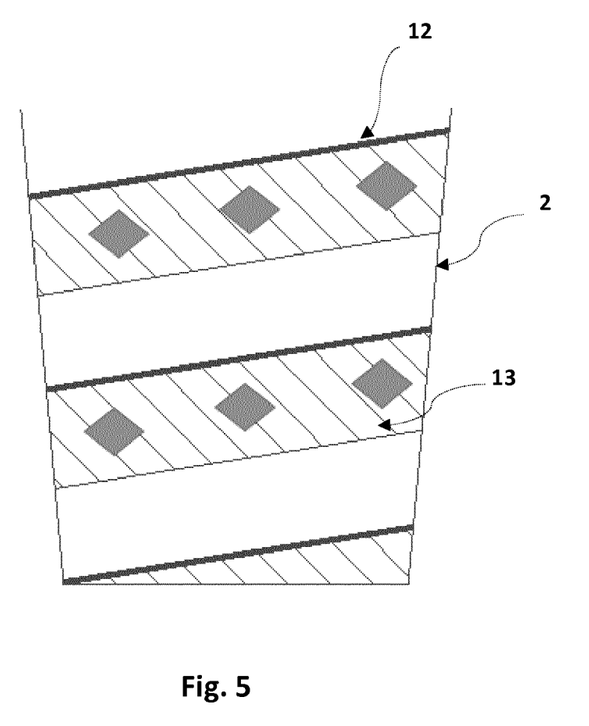
FIG. 5 is a frozen confectionery product according to the invention with inclusions and for the coating material.

FIG. 5 is an example of a product according to the invention. The product comprising a container (2) and a frozen confectionery (3) extruded into the container. It has sauce and/or chocolate patterns or coating layer (12) provided in the frozen confectionery. The sauce and/or chocolate patterns having the form of a substantially helical chocolate and/or sauce layers forming substantially annular parallel chocolate and/or sauce layers. One of the layers of the frozen confectionery comprising inclusions which may have a size of 10 to 12 mm.

Figure 6:
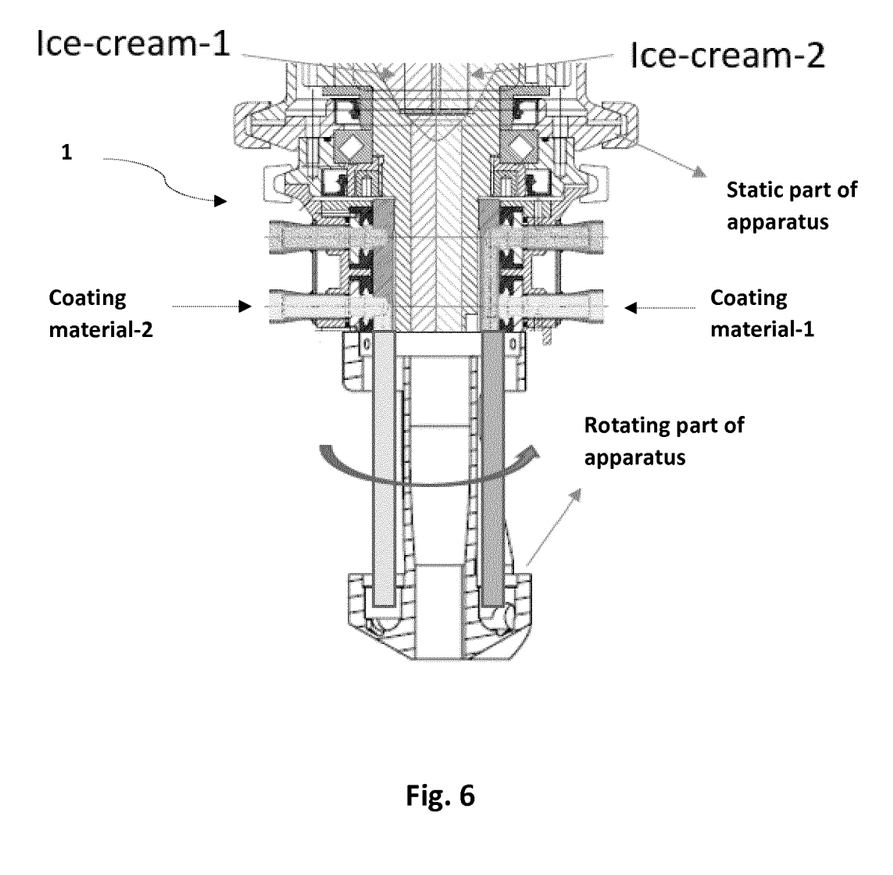
FIG. 6 is a cross sectional view of an apparatus according to the invention.

FIG. 6 shows an apparatus according to the invention. The apparatus has fixed body 12 and a rotatable nozzle are mounted concentrically. The nozzle can be rotated with respect to the fixed body around the longitudinal axis. The whole apparatus is held in a frame (not shown) and can be moved upwards and downwards.

Two types of frozen confectionery (ice cream 1 and ice cream 2) and two types of coatings (coating material 1 and coating material 2) are fed to the apparatus. FIG. 6 shows the frozen confectionery passage through which ice cream 1 and ice cream 2 are fed. Furthermore, FIG. 6 shows the passage through which the two type of coating material are fed. The coating materials are fed through the coating inlets, the coating passage and the coating outlet ports.

It should be understood that there are various changes and modifications to the presently preferred embodiments described herein which will be apparent to those skilled in the art. Such changes and modifications can be made without departing from the spirit and scope of the present subject matter and without diminishing its intended advantages. It is therefore intended that such changes and modifications be covered by the appended claims.

apparatus (1)
container (2)
nozzle (3)
frozen confectionery passage (4)
frozen confectionery passage inlet ports (5)
frozen confection outlet ports (6)
coating passages (7)
coating inlet ports (8)
corresponding coating outlet ports (9)
funnel passage (10)
land length passage (11)
helical coating layer (12)
frozen confectionery (13)

The invention claimed is:

1. A method for manufacturing a frozen confectionery product using an apparatus, the apparatus comprising:
   a nozzle comprising a frozen confectionery passage with one inlet port and a single outlet port, the single outlet port having an elongated cross-section, two coating passages with two coating inlet ports and two corresponding coating outlet ports, each of the two corresponding coating outlet ports having an elongated cross-section,
   the one inlet port and the single outlet port are joined by a funnel passage expanding at an angle of at least 35-25° relative to a flow direction in the nozzle and a land length passage having walls parallel to the flow direction of the nozzle, and
   the two corresponding coating outlet ports are positioned on inside walls of the land length passage upstream of the single outlet port and extends parallel to the single outlet port to form an annular or helical coating layer in or on the frozen confectionery product upon rotation of the nozzle and a container with respect to one another,
   wherein the method comprises:
      simultaneously extruding a frozen confectionery with inclusions having a size of 6-12 mm and coating material with or without inclusions through the single outlet port and the two corresponding coating outlet ports, respectively, of the apparatus into the container while the nozzle and the container are rotated with respect to one other at a speed to make at least 3 layers, and
      increasing the distance between the nozzle and the container by a vertical movement of one of the container or the nozzle.

2. The method according to claim 1, wherein the speed is one of:
   200-650 rpm when the container is a tub; and
   550-650 rpm when the container is a cone.

3. The method according to claim 1, wherein at least two different types of frozen confectionery are fed in separate streams through the frozen confectionery passage and the single outlet port, wherein each of the at least two different types of frozen confectionery has a viscosity of at least 10 Pa·s at a temperature of −6° C.

4. The method according to claim 1, wherein a width of the single outlet port is 10-17 mm wide, and each width of the two corresponding coating outlet ports is 3-12 mm wide.

5. The method according to claim 1, wherein a length of the single outlet port is 60-100 mm, and each length of the two coating outlet ports is 6-20 mm.

6. The method according to claim 1, wherein the two corresponding coating outlet ports are arranged symmetrically with respect to the single outlet port.

7. The method according to claim 1, wherein the two coating passages are insulated from the frozen confectionery passage until the two coating passages join the frozen confectionery passage.

8. The method according to claim 1, wherein the nozzle rotates about a vertical axis through a center of the single outlet port.

9. The method according to claim 8, wherein the two coating outlet ports are positioned at an edge of the single outlet port for the coating material to be visible on an outside of the frozen confectionery product.

10. The method according to claim 8, wherein the two coating outlet ports are positioned between an edge of the single outlet port and the vertical axis to create a coating layer internally in the frozen confectionery product.

11. The method according to claim 1, wherein at least two different types of coating material are fed in separate streams through the two coating inlet ports.

12. The method according to claim 1, wherein the inclusions have a size of 10-12 mm.

\* \* \* \* \*